(12) United States Patent
Cronin

(10) Patent No.: US 8,162,791 B1
(45) Date of Patent: Apr. 24, 2012

(54) TRANSMISSION FOR MODEL ELECTRIC VEHICLES

(76) Inventor: Michael Cronin, Montgomery, NY (US)

( * ) Notice: Subject to any disclaimer, the term of this patent is extended or adjusted under 35 U.S.C. 154(b) by 674 days.

(21) Appl. No.: 12/378,510

(22) Filed: Feb. 17, 2009

(51) Int. Cl.
*F16H 48/22* (2006.01)

(52) U.S. Cl. ....................................................... 475/249

(58) Field of Classification Search .................. 475/248, 475/249
See application file for complete search history.

(56) References Cited

U.S. PATENT DOCUMENTS

| | | | |
|---|---|---|---|
| 4,637,276 A | | 1/1987 | Holan et al. |
| 5,037,362 A | * | 8/1991 | Teraoka et al. ............... 475/235 |
| 5,104,361 A | | 4/1992 | Jenkins |
| 5,161,636 A | | 11/1992 | Haupt et al. |
| 6,733,411 B1 | | 5/2004 | Kaplan et al. |
| 6,742,640 B1 | | 6/2004 | Grogg et al. |
| 7,377,295 B2 | | 5/2008 | Byers et al. |
| 2005/0148424 A1 | * | 7/2005 | Kushino ......................... 475/249 |
| 2006/0160652 A1 | | 7/2006 | Maki et al. |
| 2008/0103011 A1 | * | 5/2008 | Gleasman et al. ............ 475/248 |

* cited by examiner

*Primary Examiner* — Edwin A Young
(74) *Attorney, Agent, or Firm* — Sandra M. Kotin

(57) ABSTRACT

A compact transmission for use in radio controlled model electric vehicles which includes a differential assembly and a slipper clutch assembly in combination with a drive means in the form of a spur gear, all contained in a single compact unit. The unit occupies substantially the same space as the differential assembly alone and does not add any significant weight to the transmission. The differential assembly is rotatably mounted within the spur gear. Clutch pads are disposed within the central opening of the spur gear and are in slippable contact with a clutch plate which is adjacent to and prevented from independent movement by one end cap of the differential housing. The slipper clutch assembly includes an adjustment nut easily rotated to adjust the compressive force of the clutch pads against the clutch plate and fixed in place when the desired compressive force is attained. Means interposed between the adjustment nut and the spur gear enable the adjustability of the compressive force. Any adjustment can be made without having to take the mechanism apart or to remove any parts. The clutch pads and spur gear can easily be replaced as needed. In use this transmission significantly reduces damage to the motor and drive train of the model vehicle even when undergoing the most rigorous trials.

20 Claims, 7 Drawing Sheets

TRANSMISSION FOR MODEL ELECTRIC VEHICLES

FIELD OF THE INVENTION

The instant invention relates to a unique transmission which is a combination of slipper clutch and differential in one compact unit for use in model electric vehicles.

BACKGROUND OF THE INVENTION

Remote controlled model cars and other model vehicles have been a realty for some time. Racing hobby grade or upscale model vehicles has become a nationwide pass-time resulting in constant efforts to increase their performance, speed and efficiency while decreasing the damages to the vehicle that are intrinsic to this activity. Until recently, most such vehicles were powered by gasoline engines, but the quieter, cleaner and more efficient electric vehicles are rapidly coming to the fore. The tracks designed for the radio controlled vehicles provide very rigorous set ups which cause the vehicles to go flying into the air and land hard, often from significant heights. These hard landings can cause considerable damage to the engines and transmissions of the vehicles. In previously designed vehicles either a slipper clutch or a differential transmission was used. The electric vehicles operated without a clutch causing the impact from a hard landing to be transmitted over the entire drive train.

Jenkins, in U.S. Pat. No. 5,104,361, discloses a means to adjust the tractive torque at the driven wheels of a scale model vehicle that employs an enclosed friction differential. A locking pin in the form of a hexagonal wrench having a long shank is inserted into the differential through a guide means and passes through the internal members. The first stub axle is prevented from rotating so that one driven wheel is locked while the other driven wheel is free to rotate. This is accomplished without having to disassemble the transmission and was, at the time, an improvement over the prior art.

There have also been developments in full sized vehicles to provide more efficient wheel differentiation. Holan et al., in U.S. Pat. No. 4,637,276, describe a vehicle differential having fewer gears then others of its time. In this system the right and left half axles are contained within a differential case. In one embodiment the ends of the half axles are not in contact and one half axle is driven while the other is permitted to free wheel and therefore will turn faster or slower than the driven wheel depending upon which side is turning. In another embodiment a slip clutch consisting of a plurality of clutch driving plates and clutch friction plates is contained within the differential case. The slip clutch is added to slippably couple rotatory motion from the left half axle to the right half axle. To achieve the same result, a controlled multi-disc slip clutch was added between the crown gear and the differential housing of the rear axle differential of an all wheel drive tractor as disclosed by Haupt et al. in U.S. Pat. No. 5,162,636. The slip status was regulated according to the parameters of the track radius to be executed and for the traction needed. In a more sophisticated system, the differential assembly includes a friction disc clutch assembly disposed within the differential case to selectively lock the differential assembly and a hydraulic clutch actuator to selectively frictionally load the clutch assembly. (Kaplan et al., U.S. Pat. No. 6,733,411) See also U.S. Pat. No. 6,742,640 to Grogg et al.

A spur gear differential designed for use in an all terrain vehicle has a first side gear configured to receive the first shaft for driving the first wheel and a second side gear configured to receive a second shaft for driving the second wheel. This assembly utilizes three sets of two planet gears. First planet gears engage the first side gear and second planet gears engage the second side gear. The assembly also has a clutch pack made up of a series of friction plates and reaction plates and an internal gear train in cooperation with a fly weight assembly. Though contained in a single package, this system utilizes a number of interactive parts that can become damaged or unseated under extreme off road conditions. (Maki et al., U.S. Patent Publication No. 2006/0160652)

A more recent patent (U.S. Pat. No. 7,377,295 to Byers et al.) describes a slipper clutch assembly for a fuel powered model vehicle. The slipper clutch transfers torque from the spur gear to a transmission input shaft and serves to protect the spur gear and engine from acute shocks to the drive train when the vehicle lands after a jump. The slipper clutch assembly interposes a friction coupling between the spur gear and the transmission input shaft which slips allowing the spur gear to rotate faster than the input shaft until the speed is slowed by the friction coupling.

Gasoline powered model cars require the use of a clutch, while electric model cars can utilize either a slipper clutch or a differential. There is a need for a transmission for model cars and especially for model electric remote controlled cars that combines the differential with a slipper clutch in a single compact unit to protect the engine and transmission from shock resulting from high impact landings and rigorous track set ups. There is a need for a compact transmission that not only takes up little space but is light weight and easily adjusted without having to be removed or taken apart. There is a need for a model car transmission that functions smoothly, is reliable and occupies substantially the same space as the present differential transmission in these vehicles.

BRIEF SUMMARY OF THE INVENTION

The present invention provides a slipper clutch and differential combination for use in model electric vehicles that currently operate with a differential but without a clutch. The combination of the present invention is compact, light weight and can be utilized in cars that are currently in use. The slipper clutch and differential combination described herein can also be used in gasoline powered vehicles and can be adapted for use in full size electric vehicles.

It is an object of the present invention to provide a slipper clutch and differential combination for model electric vehicles that combines a slipper clutch and a differential in one small compact unit.

It is another object of the present invention to provide a slipper clutch and differential combination that is lightweight, takes up minimal additional space and is easy to install in current models.

It is another object of the present invention to provide a slipper clutch and differential combination that will operate in gasoline powered as well as electric powered model vehicles.

A still further object of the present invention is to provide a slipper clutch and differential combination that provides increased smooth operation, easy handling and less wear to the motor.

A further object of the present invention is to provide a slipper clutch and differential combination that can be adjusted easily without having to take the vehicle or the transmission apart.

It is a still further object of the present invention to provide a slipper clutch and differential combination for which parts can be replaced easily.

Another object of the present invention is to provide a slipper clutch and differential combination that is easy to manufacture and is extremely durable.

A transmission for a model radio controlled vehicle is disclosed comprising a drive means in cooperation with a differential assembly and a slipper clutch assembly. The slipper clutch assembly is disposed outside of the differential assembly and the drive means, differential assembly and slipper clutch assembly are integrally combined into a single compact unit, whereby driven wheels of the vehicle can spin independently in normal use and excess torque is dissipated through the slipper clutch during harsh use and damage to the drive train is minimized.

A transmission for a model radio controlled vehicle also comprises a spur gear having a central opening, a differential assembly including a differential housing, the differential housing being rotatably supported within the central opening in the spur gear, and a slipper clutch assembly comprising a at least one clutch pad in contact relation with a clutch plate. There are also means to prevent independent rotation of the clutch plate, means to seat the at least one clutch pad in constant relation to the spur gear, and means to adjust a compressive force of the at least one clutch pad against the clutch plate which includes at least one wave spring and an adjustment nut adjacent to the at least one wave spring, both being oriented so that rotation of the adjustment nut in minute increments alters the compression of the at least one wave spring and thereby the compressive force of the least one clutch pad against the clutch plate. The spur gear, differential assembly and slipper clutch assembly are integrally combined into a single compact unit, and the drive wheels of the vehicle can spin independently in normal use and excess torque is dissipated through the clutch during harsh use and damage to the drive train is minimized.

The instant invention is also a transmission for a model radio controlled vehicle comprising a spur gear having a central opening with a first side of the opening and a second side of the opening. There is a differential assembly including a cylindrical differential housing closed at a first end by a first circular end cap and at a second end by a second circular end cap and having a smooth outer surface adjacent the first end cap and a threaded outer surface adjacent the second end cap. The first end cap being larger in diameter than the differential housing and the second end cap having substantially the same diameter as the differential housing. The differential housing is rotatably supported within the central opening in the spur gear such that the threaded end is entirely outside of the central opening. The invention includes a slipper clutch assembly comprising at least one clutch pad in contact relation with a clutch plate, means to prevent independent rotation of the clutch plate, and means to adjust a compressive force of the at least one clutch pad against the clutch plate, the at least one clutch pad being disposed within the first side of the central opening of the spur gear and is in constant rotation therewith and the clutch plate is in cooperation with the first end cap.

Also disclosed is a method for adjusting the driven wheel slippage in a model radio controlled vehicle comprising the steps of installing into the model radio controlled vehicle a differential assembly in combination with a slipper clutch assembly and a drive means in a single compact unit, the drive means comprising a spur gear having a central opening, the differential assembly including a cylindrical differential housing rotatably supported within the central opening of the spur gear and being closed at a first end by a first circular end cap and at a second end by a second circular end cap the second circular end cap having two opposing flat areas on its circumference and means to securely attach the end caps to the housing. The housing has a smooth outer surface adjacent the first end cap and a threaded outer surface adjacent the second end cap, at least one clutch pad disposed within the spur gear, in constant rotation therewith and in slippable relation to a clutch plate being disposed in cooperation with the inner surface of the first end cap such that the clutch plate is prevented from independent rotation, a rotatable adjustment nut having a threaded central opening and means to permit and to prevent rotation of the adjustment nut, the adjustment nut being disposed on the threaded surface of the housing, means to transmit a compressive force to the spur gear and thereby to the at least one clutch pad the means being disposed on the smooth surface of the housing between the adjustment nut and the spur gear, whereby the adjustment nut is used to adjust the compressive force and thereby the slippage of the at least one clutch pad. The method also includes the steps of permitting the adjustment nut to be rotated as needed, preventing the differential housing from movement when the adjustment nut is rotated by means of the two flat areas on the circumference of the second end cap, rotating the adjustment nut toward the spur gear until a desired compressive force is maintained and thereby transferred to the spur gear and the at least one clutch pad, preventing the adjustment nut from further rotation, putting the radio controlled model vehicle on a track and through trial movements, and finding that there is no slippage of the clutch assembly. Thereafter removing the radio controlled model vehicle from the track, permitting the adjustment nut to be rotated as needed, preventing the differential housing from movement when the adjustment nut is rotated by means of the two flat areas on the circumference of the second end cap, rotating the adjustment nut away from the spur gear until a desired compressive force is maintained and thereby transferred to the spur gear and the at least one clutch pad, preventing the adjustment nut from further rotation, and putting the model vehicle back on the track and through trial movements. Then finding that there is sufficient slippage of the clutch assembly; and continuing to put the model radio controlled vehicle through the movements for which the track was designed, whereby the slipper clutch is operational as desired and the vehicle can be put through its trials and damage to the motor and drive train is minimized.

Other features and advantages of the invention will be seen from the following description and drawings.

DETAILED DESCRIPTION OF THE INVENTION

Figure 1:
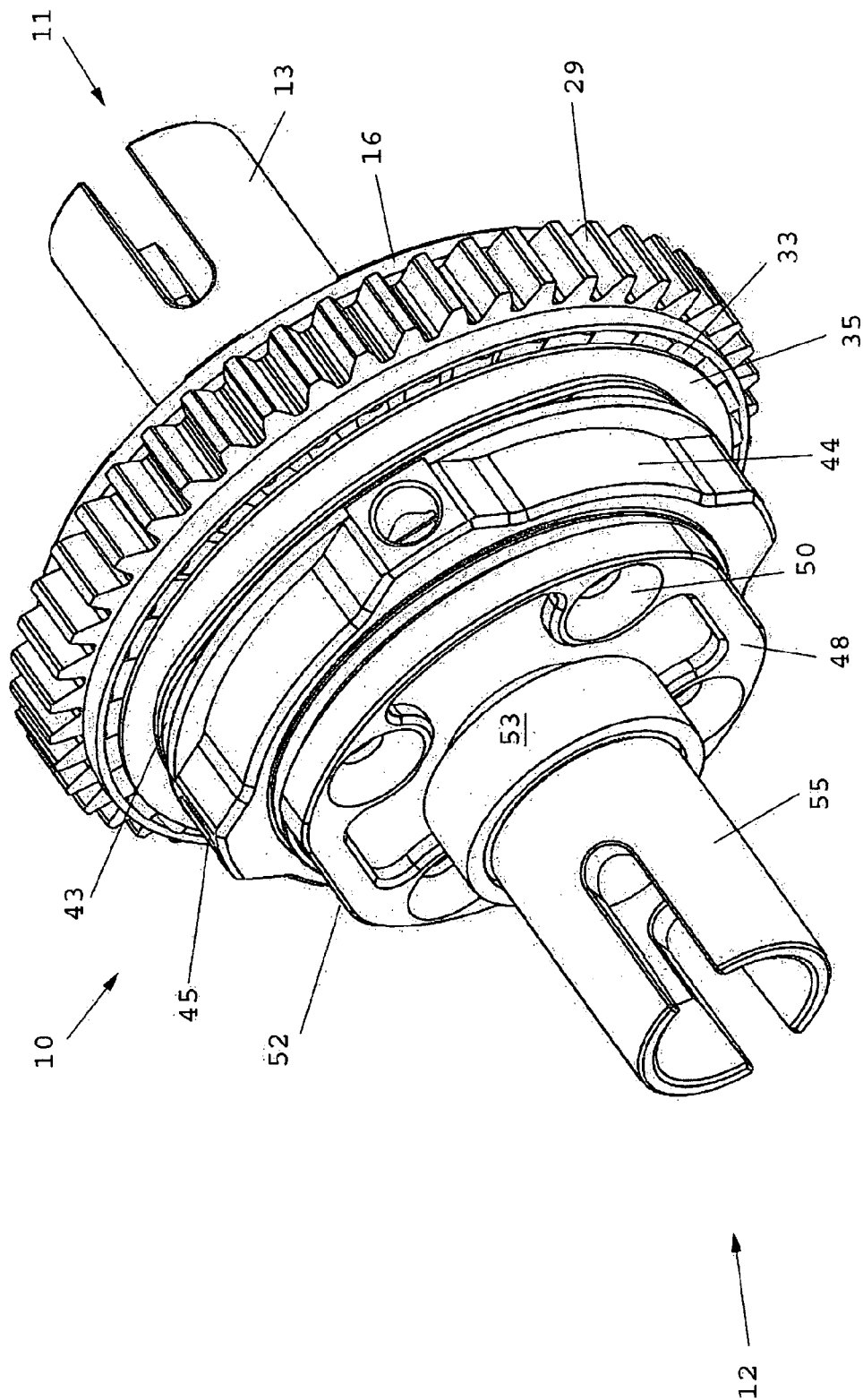
FIG. 1 is a left perspective view of the transmission of the present invention.
Figure 2:
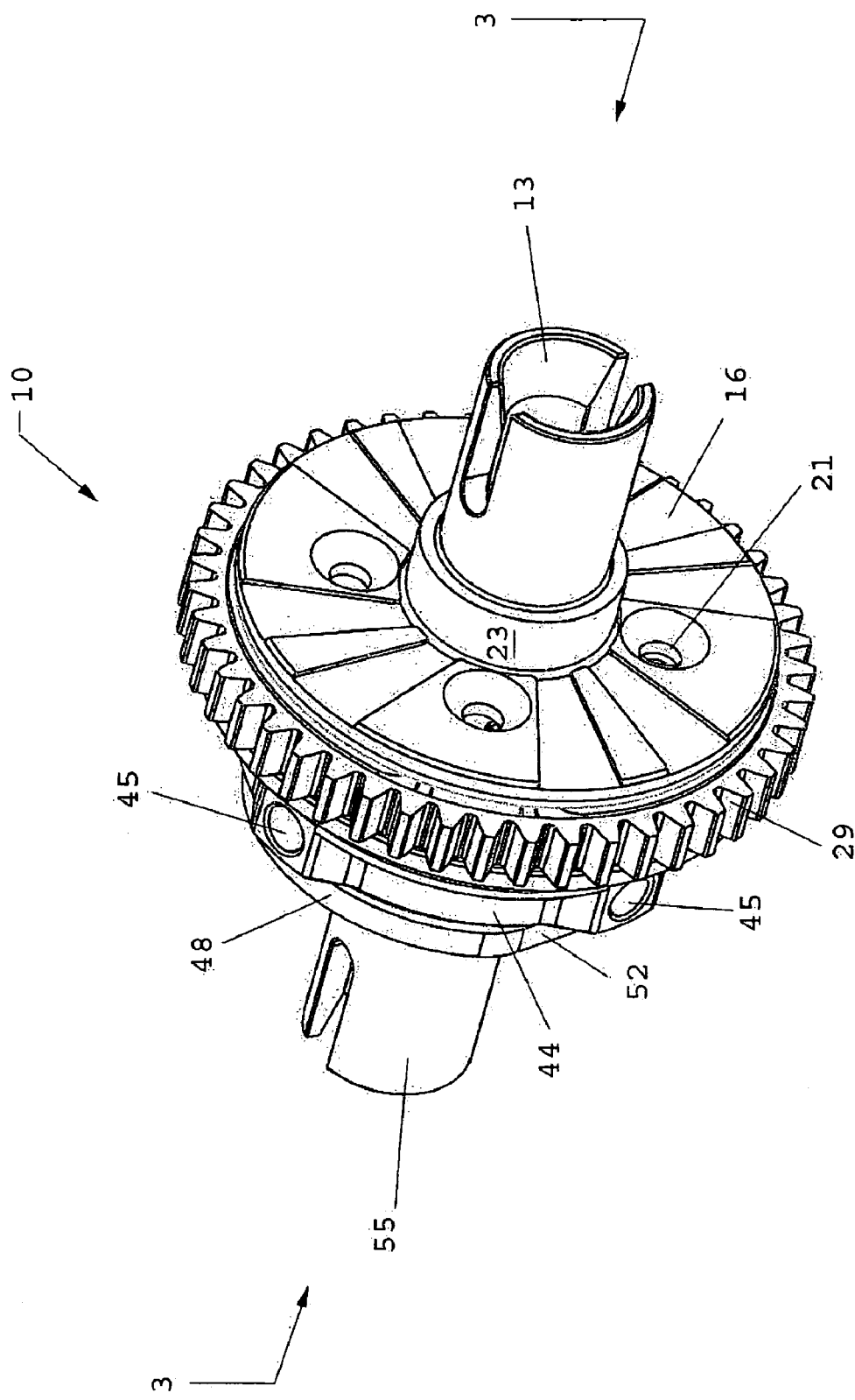
FIG. 2 is a right perspective view of the transmission.

The slipper clutch-differential combination, or "slipperential" 10 of the present invention is a single compact unit that can easily be installed to replace the differential assembly that is currently being used in remote operated electric model cars and other model vehicles. The slipperential 10 functions as the transmission of the directly driven vehicle and occupies substantially the same space as the differential alone while not adding any appreciable weight to the system. This unique combination reduces the space, weight and number of moving parts while providing less potential failure points as compared to having a separate clutch and a differential. It also attenuates the shock to the various components of the vehicles when they are put through their paces on rigorous racing tracks. The slipperential 10 may be seen in FIGS. 1 through 7.

The slipperential 10 may be composed of three elements, a differential assembly, a simple clutch assembly and a drive means. In the embodiment described in detail herein the differential assembly may be contained within a differential housing or diff cup, the clutch assembly may be adjacent to one diff cup end cap and integral with the drive means which may be a spur gear surrounding the diff cup. These three components may form one single compact and lightweight unit. These same three components may be arranged somewhat differently and still encompass the teachings of the instant invention.

The slipperential 10 may have a first end 11 and a second end 12, each of which may be associated with one of the driven wheels of the vehicle. The opposing axle half shafts (not illustrated) may be connected to the slipperential 10 by cooperation with a first drive cup 13 extending outwardly from the first end 11 and a second drive cup 55 extending outwardly from the second end 12.

Figure 6:
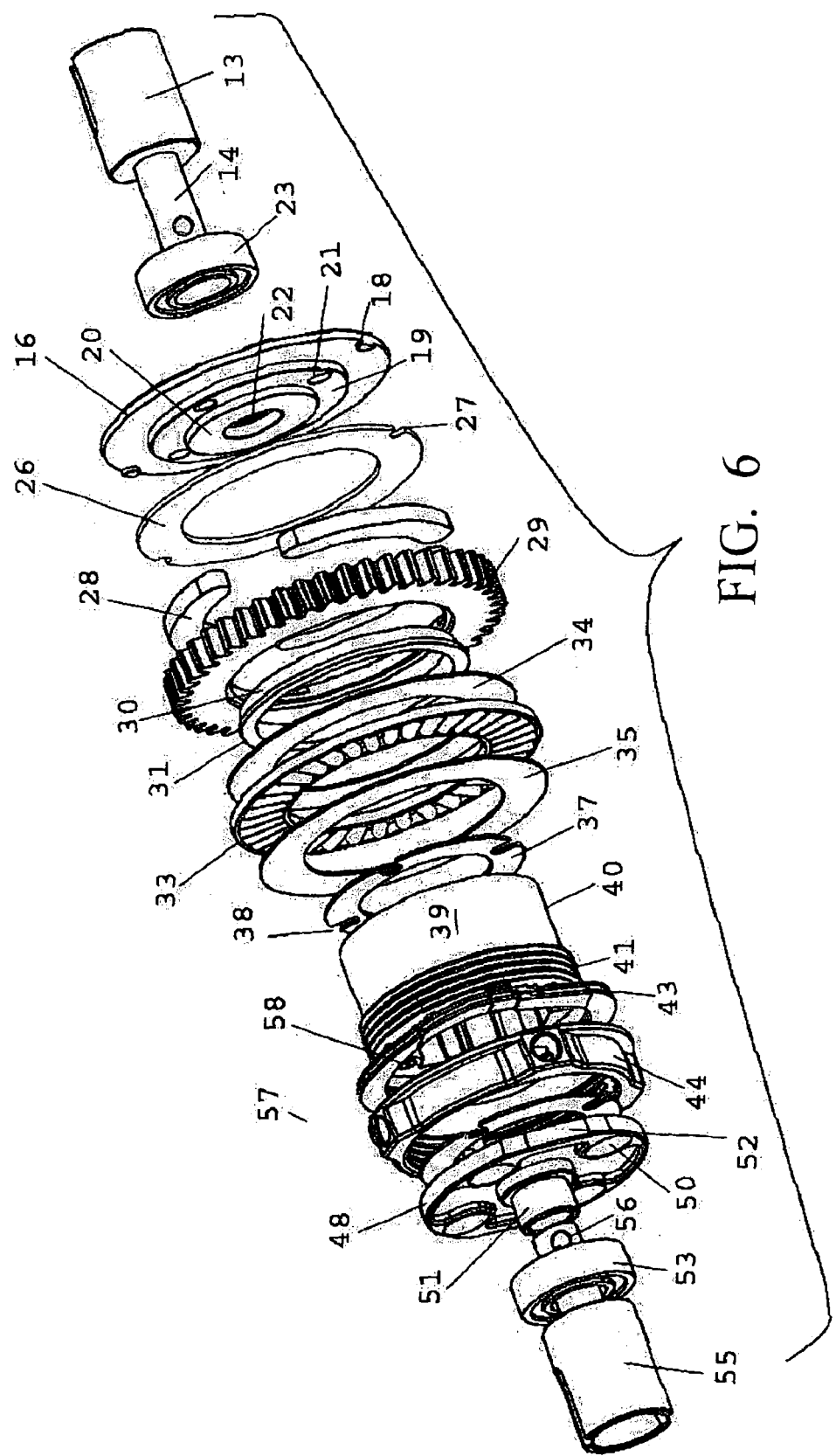
FIG. 6 is a left perspective exploded view of the transmission.
Figure 7:
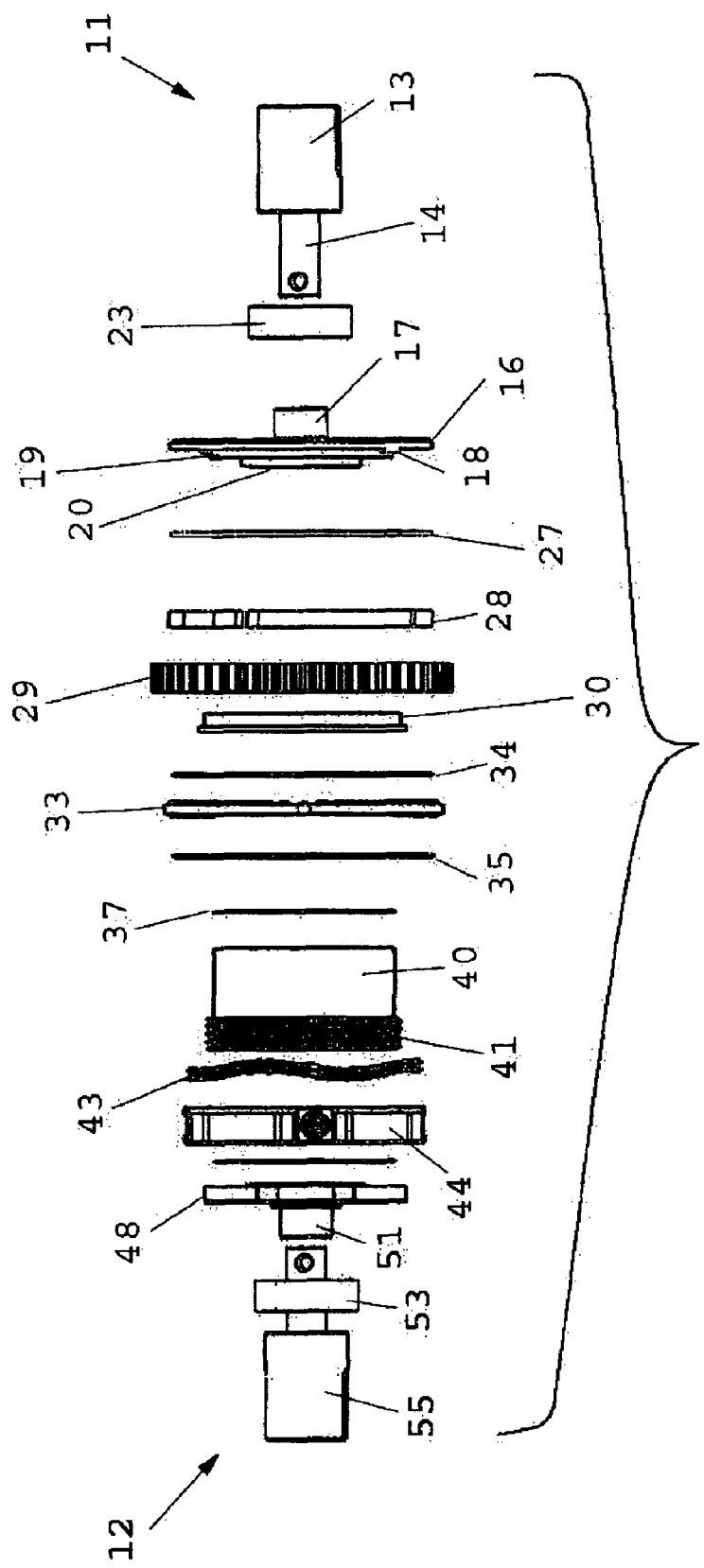
FIG. 7 is a right plan exploded view of the transmission.

The individual components of the slipperential assembly 10 will be discussed in the order in which they are positioned along a central axis from the first end 11 toward the second end 12 as shown in the exploded views of FIGS. 4 through 7. The first end of the unit may be closed by means of a first end cap 16 having a hub 17 extending from its outer surface. There may be a bearing 23 disposed on the hub 17 and the shaft 14 of the first drive cup 13 may extend inwardly through the hub 17 and into the differential assembly. All of these features may be seen in FIG. 3. The first end cap 16 may have two opposing inwardly facing protrusions 18 situated along the rim of the inner surface, and two integral concentric stepped plates 19 and 20, 19 being the larger and innermost and 20 the smaller, centered on the inner surface as seen in FIG. 6. There may be four attachment apertures 21 through the first end cap 16 which pass through the larger plate 19 and a central bore 22 which may extend through both plates 19 and 20. The attachment apertures 23 may receive the bolts 54 used to attach the first end cap 16 to the diff cup 40.

The first end cap 16 may cooperate with the slipper clutch assembly. Adjacent to the inner surface of the first end cap 16 may be a stainless steel clutch plate 26 having two opposing notches 27 in its peripheral rim. The clutch plate 26 may be seated flush against the inner surface of the first end cap 16 and may have a central opening substantially equal in diameter to that of the larger stepped plate 19 and may surround the stepped plate 19. The notches 27 may cooperate with the protrusions 18 on the inner surface of the first end cap 16 and prevent the clutch plate 26 from independent rotation. Abutting the clutch plate 26 may be three coplanar clutch pads 28 arranged around the central axis.

The next structure seen in FIGS. 4 through 7 may be the spur gear 29 which may a have central opening and an inner rim facing the first end 11 into which the clutch pads 28 may be seated. Symmetrically arranged flanges 25 on the inner rim may maintain the clutch pads 28 in equidistant orientation. The clutch plate 26 may be immediately adjacent to the side surface of the spur gear 29 and cooperate with clutch pads 28 which may extend beyond the side surface of the spur gear 29 sufficiently to make contact with the clutch plate 26. Also disposed within the central opening of the spur gear 29 opposite the clutch pads 28 may be a Teflon® bushing 30. The bushing 30 may have a thin flange 31 about its circumference that fits within a depression 32 around the central opening in the spur gear 29 on the side surface facing the second end 12. This flange 31 may be coplanar with the side surface of the spur gear 29 and may be seen in FIGS. 3 and 5. The flange 31 and depression 32 may provide a secure seating for the bushing 30. This bushing 30 may assist in maintaining concentricity of the diff cup 40 and minimize wear on the external surface of the diff cup 40.

Adjacent to and contiguous with the side surface of the spur gear 29 and flange 31 of the bushing 30 may be a stainless steel washer 34 followed by a needle bearing 33 and then a second stainless steel washer 35. The needle bearing 33 may allow the slip action to be independent of the adjustment assembly and may prevent axial movement of the adjustment nut 44 (described below). The combination of the structures from the washer 35 to the first end cap 16 may lie in close proximity forming a compact unit. All of the structures from the clutch plate 26 through the washer 35 may have central openings of the same diameter which may be collectively referred to as the diff cup opening. The outer diameter of stepped plate 19 on the first end cap 16 may be substantially of this same dimension.

Continuing along the horizontal axis and seen in FIGS. 4 through 7 may be a gasket 37 with an outer diameter equal to that of the diff cup opening. This gasket 37 may have notches 38 in its outer perimeter spaced to correspond with the attachment apertures 21 in the first end cap 16. The next component seen in FIGS. 4 through 7 is the cylindrical differential housing or diff cup 40. When the slipperential 10 is fully assembled the diff cup 40 may be disposed within the diff cup opening and the gasket 37 may abut stepped plate 19 on the first end cap 16. The side edge of the open first end of the diff cup 40 may be flush with the gasket 37 which may form a tight seal between the first end of the diff cup 40 and stepped plate 19 on the first end cap 16 to close the first end of the diff cup 40. The diameter of the first end cap 16 may be greater than the outer diameter of the diff cup 40. The diameter of the stepped plate 19 may be substantially the same as the outer diameter of the diff cup 40.

Figure 3:
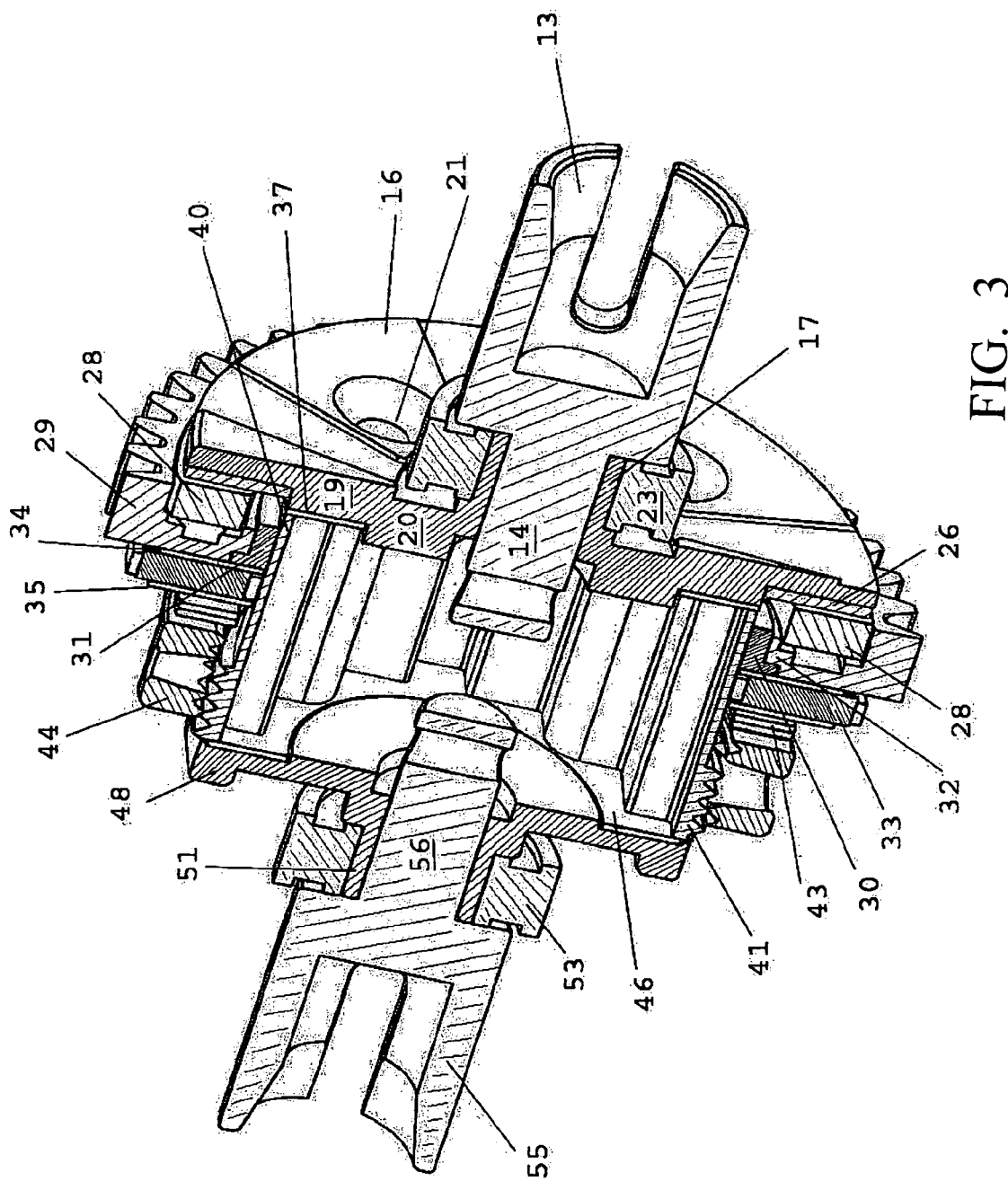
FIG. 3 is a sectional view through line 3-3 of FIG. 2.
Figure 4:
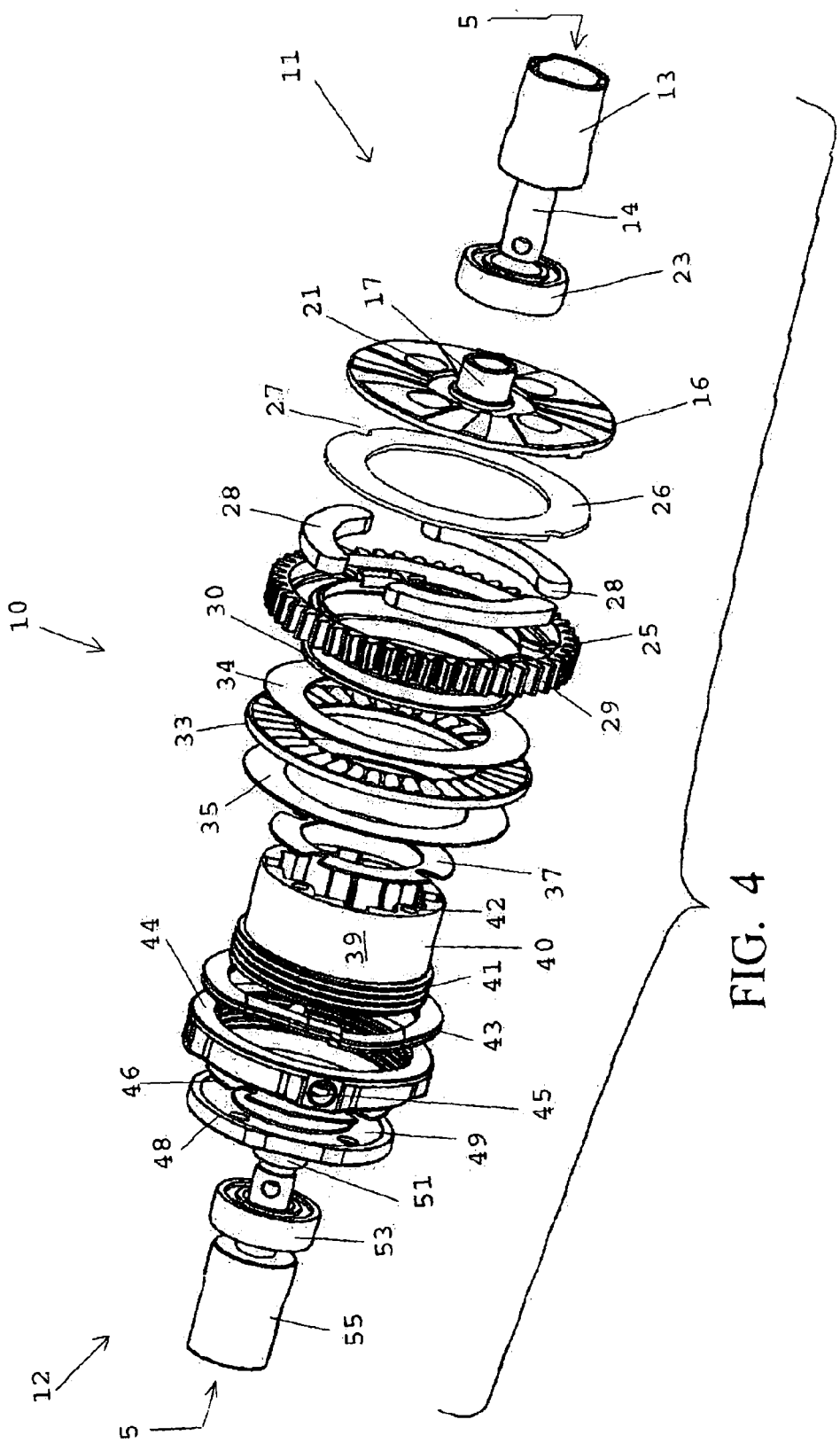
FIG. 4 is a right perspective exploded view of the transmission.
Figure 5:
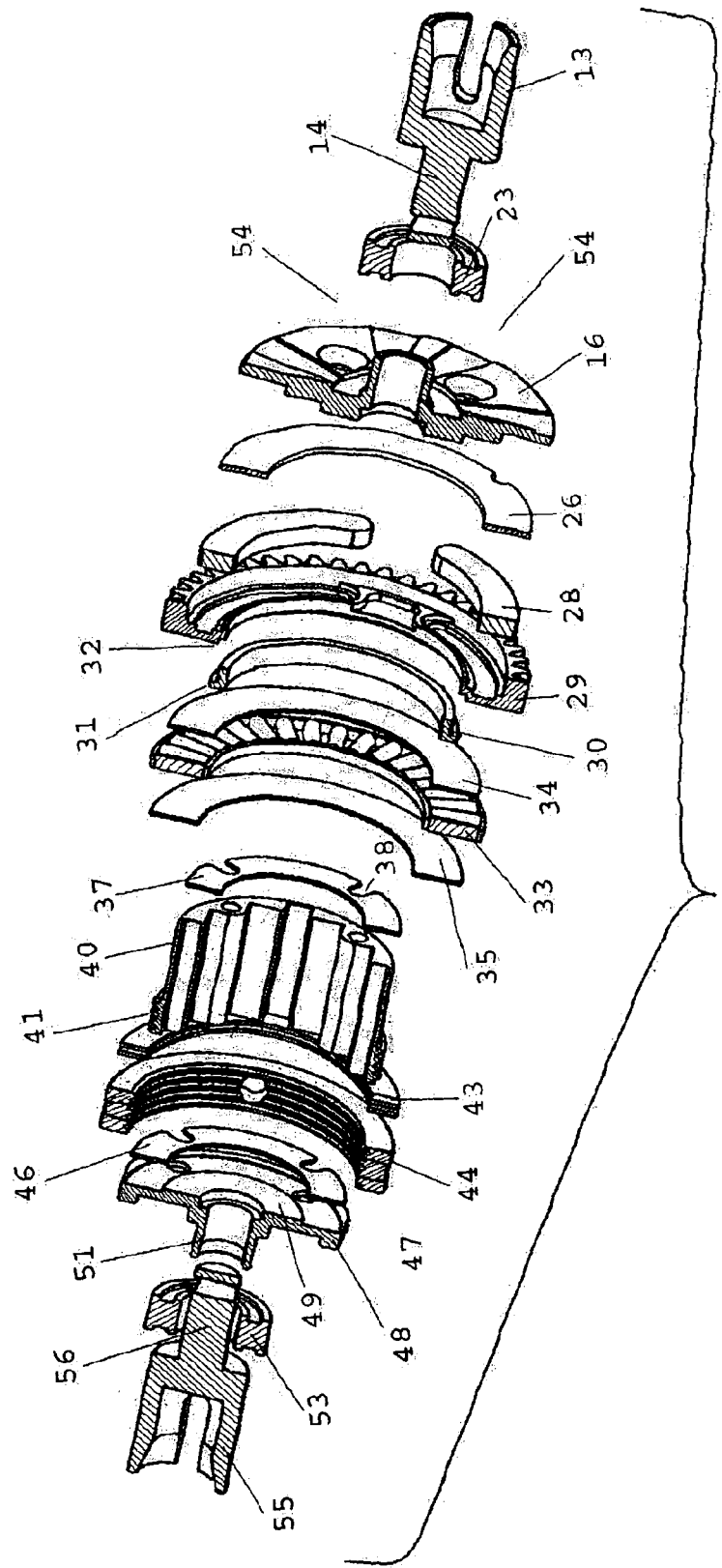
FIG. 5 is section through line 5-5 of FIG. 4.

The interior structure of the diff cup 40 is of standard construction and will not be further described. The shaft 14 of the first drive cup 13 and the shaft 56 of the second drive cup 55 may extend into the diff cup 40 from opposing sides as seen in FIG. 3.

The portion of the external surface of the diff cup 40 facing the first end 11 may be smooth 39 while the portion of the external surface facing the second end 12 may be threaded 41, the threads extending outward from the surface. Most of the smooth portion 39 may be disposed within the diff cup opening. The threaded portion may extend beyond the diff cup opening and may not fit through it. There may be four axial apertures 42 in the cylindrical wall at the first end of the diff cup 40 spaced to correspond to the attaching apertures 21 in the first end cap 16.

Returning to FIGS. 4 through 7, adjacent to the second end of the diff cup 40 may be seen two wave springs 43, followed by the adjustment nut 44, a gasket 46 and the second end cap 48. The wave springs 43 may provide consistent tension throughout their compressive range so that the essential settings of the adjustment nut 44 do not have to be changed as the clutch pads 28 begin to wear. When the slipperential 10 is assembled, the wave springs 43 may be situated on the smooth portion 39 of the diff cup 40 and may be adjacent to washer 35. The adjustment nut 44 may be disposed on and may cooperate with the threading 41 on the diff cup 40 and may abut the wave springs 43. The adjustment nut 44 may be rotatable in minute increments and may be able to be fixed securely in position once its optimum position is determined. One form of adjustment nut is illustrated and described herein, but other forms known in the art may be utilized. In the illustrated example there may be four equidistantly spaced radial openings 45 through the adjustment nut 44. Four soft tip set screws 57 may cooperate with these openings 45 to fix the adjustment nut 44 in place. Once the adjustment nut 44 is set to provide the desired degree of slip to the slipper clutch assembly the setting may not have to be changed due to the consistent tension of the wave springs 43 as noted above.

The second end of the diff cup 40 may be sealed by the gasket 46 and the second end cap 48. The gasket 46 may have four notches 47 on its outer rim corresponding to four attaching apertures 50 in the second end cap 48 and corresponding axial apertures 58 in the cylindrical wall at the second end of the diff cup 40. There may be a depression 49 in the inner surface of the second end cap 48 which may be dimensioned to accept the gasket 46 and to insure a tight seal between the second end cap 48 and the second end of the diff cup 40. The outer diameter of the second end cap 48 may be substantially equal to the outer diameter of the diff cup 40. A hub 51 may extend from the outer surface of the second end cap 48. Though the second end cap 48 may be substantially round, there may be two opposing flat surfaces 52 on its circumference. (See FIG. 1) A bearing 53 may be disposed on the hub 51 of the second end cap 48 and the shaft 56 of the second drive cup 55 may pass through this hub 51 and into the differential assembly.

When the slipperential 10 is assembled the attaching screws or bolts 54 may pass through the attaching apertures 21 in the first end cap 16 into the attaching apertures 42 in the first end of the diff cup 40 wall. The second end cap 48 may be secured with similar bolts or screws through the attaching apertures 50 in the second end cap 48 and into the attaching apertures 58 in the second end of the diff cup 40 wall to maintain a tight closure of the diff cup 40. The two gaskets 37 and 46 may be made of a cellulosic material and may insure a tight seal on each end of the diff cup 40.

The adjustment nut 44 may maintain the wave springs 43, washers 34 and 35 and needle bearing 33 in close proximity to the spur gear 29. The position of the adjustment nut 44 and the compressibility of the wave springs 43 may determine the amount of compressive force exerted by the clutch pads 28 against the clutch plate 26. Therefore, the position of the adjustment nut 44 may be used to adjust slip by increasing or decreasing this compressive force. The adjustment nut 44 may be moved toward the first end 11 to increase the compressive force or toward the second end 12 to decrease the compressive force. This may be accomplished by loosening the soft tipped set screws 57 and rotating the adjustment nut 44 until the desired compressive force is attained. The set screws 57 may thereafter be retightened to maintain the adjustment nut 44 in its new position. The set screws 57 do not have to be removed completely. The clutch plate 26 may be prevented from moving by means of the notches 27 in the rim of the clutch plate 26 and the protrusions 18 in the inner surface of the first end cap 16. Thus slippage may be controlled solely by the moving the adjustment nut 44 to increase or decrease the compressive force. If the compressive force is excessive there may be no slip and if it is too loose there may be no movement. Any adjustments may be accomplished without the need to take the vehicle or the slipperential 10 apart. Though this slipper clutch assembly consists of only one set of clutch pads and one stationary clutch plate, the ability to make minute changes to the compressive force provides all of the slip necessary to achieve the desired result while conserving space and weight.

As noted above, adjustments to the clutch assembly may be easily made by rotating the adjustment nut 44. The two flat surfaces 52 on the circumference of the second end cap 48 may aid in holding the diff cup 40 and preventing it from rotating when the adjustment nut 44 is being rotated to change its setting The clutch pads 28, the Teflon® bushing 30 and/or the spur gear 29, or any part from washer 35 through the clutch plate 26, may be changed as needed by removing the first end cap 16. During this process the adjustment nut 44 is not disturbed and upon reassembly the tension on the slipper clutch assembly may be essentially unchanged. The fluid in the differential assembly may be changed by removing the second end cap 48. This maintenance function also may have no effect on the setting of the adjustment nut 44. Removal of the adjustment nut 44 may be accomplished either by removing the first end cap 16 and all parts from washer 35 through the clutch plate 26, or by removal of the second end cap 48.

One of the unique characteristics of the instant invention is the fact that the complete slipper clutch assembly is located outside of and separate from the differential assembly and specifically outside of the diff cup. The differential assembly and the slipper clutch assembly may be described as being two units working independently together. The slipper clutch assembly is independently adjustable. Any adjustment may be made by means of the adjustment nut. The differential action may be adjusted independently from the slip action. The viscosity of the fluid used may determine the variations within the differential. Thus to alter the differential performance, the second end cap 48 may be removed and the fluid changed. No other part need be removed and no settings changed. Each end cap may be removed separately to make an adjustment or change a part, without disrupting the opposite end.

The Teflon® bushing 30 may serve to minimize friction and prevent heat build up as well as maintain the diff cup 40 in concentric relation to the spur gear 29. As noted, the bushing 40 may be easily changed. The adjustment nut 44 may be made of hard coat anodized aluminum to provide the desired long lasting performance without adding excess weight.

The slipperential 10 of the instant invention functions to protect the transmission by attenuating shock to the various components and may be used in a remote operated car using an electric motor. It will also function in a gasoline powered car and may be adapted for a full size electric car. The remote operated cars utilizing the slipperential 10 may be radio controlled upscale hobby grade cars that are run on their own race tracks which are designed to put the cars through rigorous performance trials. The electric cars may provide a quiet operation and yet offer the same performance options as their gasoline powered counterparts. With the addition of the slip ability, the electric cars may be able to perform all of the same jumps and spills while minimizing damage to the motor and drive train. The slipperential 10 may function as the transmission of the car and may be directly driven. When the differential was used alone and the wheels rotated together, often when the car came down from a high jump there was no provision for slippage and the transmission as well as other parts of the car would sustain considerable damage. With the addition of the simple slipper clutch to the transmission there is no discernable weight addition, and space is conserved as well as the number of moving parts. The slipperential of the instant invention may provide for less potential failure points and may allow the differential to slip with relation to the rigidly coupled drive gear to eliminate shock to the various components and to prevent damage to the motor and transmission. Cars equipped with the slipperential handle well, are quiet, operate smoothly and can be easily adjusted without having to remove the transmission or to take the car apart.

While one embodiment of the present invention has been illustrated and described in detail, it is to be understood that this invention is not limited thereto and may be otherwise practiced within the scope of the following claims.

I claim:

1. A transmission for a model radio controlled vehicle comprising:
    a drive means in cooperation with a differential assembly and a slipper clutch assembly, said slipper clutch assembly being disposed outside of said differential assembly and said drive means, differential assembly and slipper clutch assembly being integrally combined into a single compact unit, whereby driven wheels of the vehicle can spin independently in normal use and excess torque is dissipated through the slipper clutch during harsh use and damage to the drive train is minimized.

2. A transmission for a model radio controlled vehicle comprising:
    a spur gear having a central opening;
    a differential assembly including a differential housing, said differential housing being rotatably supported within the central opening in the spur gear; and
    a slipper clutch assembly comprising at least one clutch pad in contact relation with a clutch plate, means to prevent independent rotation of the clutch plate, means to seat the at least one clutch pad in constant relation to the spur gear, and means to adjust a compressive force of the at least one clutch pad against the clutch plate including at least one wave spring and an adjustment nut adjacent said at least one wave spring, both being oriented such that rotation of the adjustment nut in minute increments alters the compression of the at least one wave spring and thereby the compressive force of the at least one clutch pad against the clutch plate;
    whereby the spur gear, differential assembly and slipper clutch assembly are integrally combined into a single compact unit, and drive wheels of the vehicle can spin independently in normal use and excess torque is dissipated through the clutch during harsh use and damage to the drive train is minimized.

3. A transmission for a model radio controlled vehicle comprising:
    a spur gear having a central opening with a first side of the opening and a second side of the opening;
    a differential assembly including a cylindrical differential housing closed at a first end by a first circular end cap and at a second end by a second circular end cap and having a smooth outer surface adjacent the first end cap and a threaded outer surface adjacent the second end cap, said first end cap being larger in diameter than said differential housing and said second end cap having substantially the same diameter as the differential housing, said differential housing being rotatably supported within the central opening in the spur gear such that the threaded end is entirely outside of said central opening; and
    a slipper clutch assembly comprising at least one clutch pad in contact relation with a clutch plate, means to prevent independent rotation of the clutch plate, and means to adjust a compressive force of the at least one clutch pad against the clutch plate, said at least one clutch pad being disposed within the first side of the central opening of the spur gear and in constant rotation therewith, and said clutch plate being in cooperation with the first end cap.

4. A transmission for a model radio controlled vehicle as described in claim 3 further comprising a bushing disposed on the smooth surface of the central opening in the spur gear whereby friction is reduced, heat build up is prevented and the differential housing is maintained in concentric relation to the spur gear.

5. A transmission for a model radio controlled vehicle as described in claim 3 further comprising sealing gaskets disposed between the first end of the differential housing and the first end cap and between the second end of the differential housing and the second end cap.

6. A transmission for a model radio controlled vehicle as described in claim 3 further comprising means to securely and reversibly attach the two end caps to the differential housing.

7. A transmission for a model radio controlled vehicle as described in claim 6 wherein the means to attach the two end caps to the differential housing comprises a series of communicating attachment apertures in the first end cap and in the first end of the differential housing, a series of communicating attachment apertures in the second end cap and in the second end of the differential housing, and bolt means to reversibly and securely affix each end cap to the differential housing.

8. A transmission for a model radio controlled vehicle as described in claim 3 wherein the first end cap further comprises two concentric stepped plates extending from its inner surface, the first plate being of substantially the same diameter as the exterior diameter of the differential housing and the second plate being of substantially the same diameter as the interior diameter of the differential housing whereby the first end of the differential housing cooperates with the exposed area of the first plate.

9. A transmission for a model radio controlled vehicle as described in claim 3 wherein the outer diameter of the clutch plate is substantially equal to the outer diameter of the first end cap.

10. A transmission for a model radio controlled vehicle as described in claim 3 wherein the means to prevent the clutch plate from independent rotation comprises at least two protrusions on the inside surface of the first end cap adjacent the rim and at least two similarly disposed notches about the rim of the clutch plate, said notches cooperating with said protrusions.

11. A transmission for a model radio controlled vehicle as described in claim 3 further comprising at least one wave spring disposed about the smooth portion of the differential housing such that a compressive force against the at least one wave spring will be transmitted to the spur gear and thereby to the at least one clutch pad, and means to adjust the compressive force.

12. A transmission for a model radio controlled vehicle as described in claim 11 wherein the means to adjust the compressive force against the at least one wave spring and thereby the clutch pads comprises an adjustment nut having a threaded central opening and being disposed on the threaded portion of the outer surface of the differential housing such that the threading within the adjustment nut cooperates with the threading on the housing to enable the adjustment nut to be rotated clockwise or counterclockwise in minute increments to compress or decompress the wave springs and thereby to increase or decrease the compressive force against the spur gear and against the at least one clutch pad.

13. A transmission for a model radio controlled vehicle as described in claim 12 further comprising means to maintain the adjustment nut in a desired non-rotatable position after being rotated to adjust the compressive force against the spur gear.

14. A transmission for a model radio controlled vehicle as described in claim 12 further comprising two opposing flat surfaces along the outer rim of the second circular end cap whereby the differential housing is prevented from movement when the adjustment nut is being rotated.

15. A transmission for a model radio controlled vehicle as described in claim 3 further comprising means to allow the slip action of the slipper clutch assembly to be independent of the adjustment means.

16. A transmission for a model radio controlled vehicle as described in claim 15 wherein the means to allow the slip action to be independent of the adjustment means comprises a circular needle bearing and two circular washers, one on each side of the needle bearing, all having central openings and being disposed about the differential housing adjacent the second side of the spur gear.

17. A transmission for a model radio controlled vehicle as described in claim 3 further comprising a first cylindrical end cap hub extending outwardly from the outer surface of the first end cap and a second cylindrical end cap hub extending outwardly form the outer surface of the second end cap through which driven wheels of the vehicle can be connected to the differential assembly.

18. A transmission for a model radio controlled vehicle as described in claim 17 further comprising a bearing disposed on each cylindrical end cap hub.

19. A transmission for a model radio controlled vehicle as described in claim 3 wherein the driven wheels of the vehicle are connected to the differential assembly by means of a first drive cup and a second drive cup.

20. A method for adjusting the driven wheel slippage in a model radio controlled vehicle comprising the steps of:
   installing into the model radio controlled vehicle a differential assembly in combination with a slipper clutch assembly and a drive means in a single compact unit, said drive means comprising a spur gear having a central opening, said differential assembly including a cylindrical differential housing rotatably supported within the central opening of the spur gear and being closed at a first end by a first circular end cap and at a second end by a second circular end cap said second circular end cap having two opposing flat areas on its circumference and means to securely attach said end caps to said housing, said housing having a smooth outer surface adjacent the first end cap and a threaded outer surface adjacent the second end cap, at least one clutch pad disposed within the spur gear, in constant rotation therewith and in slippage relation to a clutch plate being disposed in cooperation with the inner surface of the first end cap such that the clutch plate is prevented from independent rotation, a rotatable adjustment nut having a threaded central opening and means to permit and to prevent rotation of the adjustment nut, said adjustment nut being disposed on the threaded surface of the housing, means to transmit a compressive force to the spur gear and thereby to the at least one clutch pad said means being disposed on the smooth surface of the housing between the adjustment nut and the spur gear, whereby the adjustment nut is used to adjust the compressive force and thereby the slippage of the at least one clutch pad;
   permitting the adjustment nut to be rotated as needed;
   preventing the differential housing from movement when the adjustment nut is rotated by means of the two flat areas on the circumference of the second end cap;
   rotating the adjustment nut toward the spur gear until a desired compressive force is maintained and thereby transferred to the spur gear and the at least one clutch pad;
   preventing the adjustment nut from further rotation;
   putting the radio controlled model vehicle on a track and through trial movements;
   finding that there is no slippage of the clutch assembly;
   removing the radio controlled model vehicle from the track;
   permitting the adjustment nut to be rotated as needed;
   preventing the differential housing from movement when the adjustment nut is rotated by means of the two flat areas on the circumference of the second end cap;
   rotating the adjustment nut away from the spur gear until a desired compressive force is maintained and thereby transferred to the spur gear and the at least one clutch pad;
   preventing the adjustment nut from further rotation;
   putting the model vehicle back on the track and through trial movements;
   finding that there is sufficient slippage of the clutch assembly; and
   continuing to put the model radio controlled vehicle through the movements for which the track was designed;
whereby the slipper clutch is operational as desired and the vehicle can be put through its trials and damage to the motor and drive train is minimized.

* * * * *